L. M. LEVINE.
VENDING MACHINE OR THE LIKE.
APPLICATION FILED OCT. 5, 1914.

1,171,616.

Patented Feb. 15, 1916.
12 SHEETS—SHEET 1.

WITNESSES

INVENTOR

ATTORNEYS

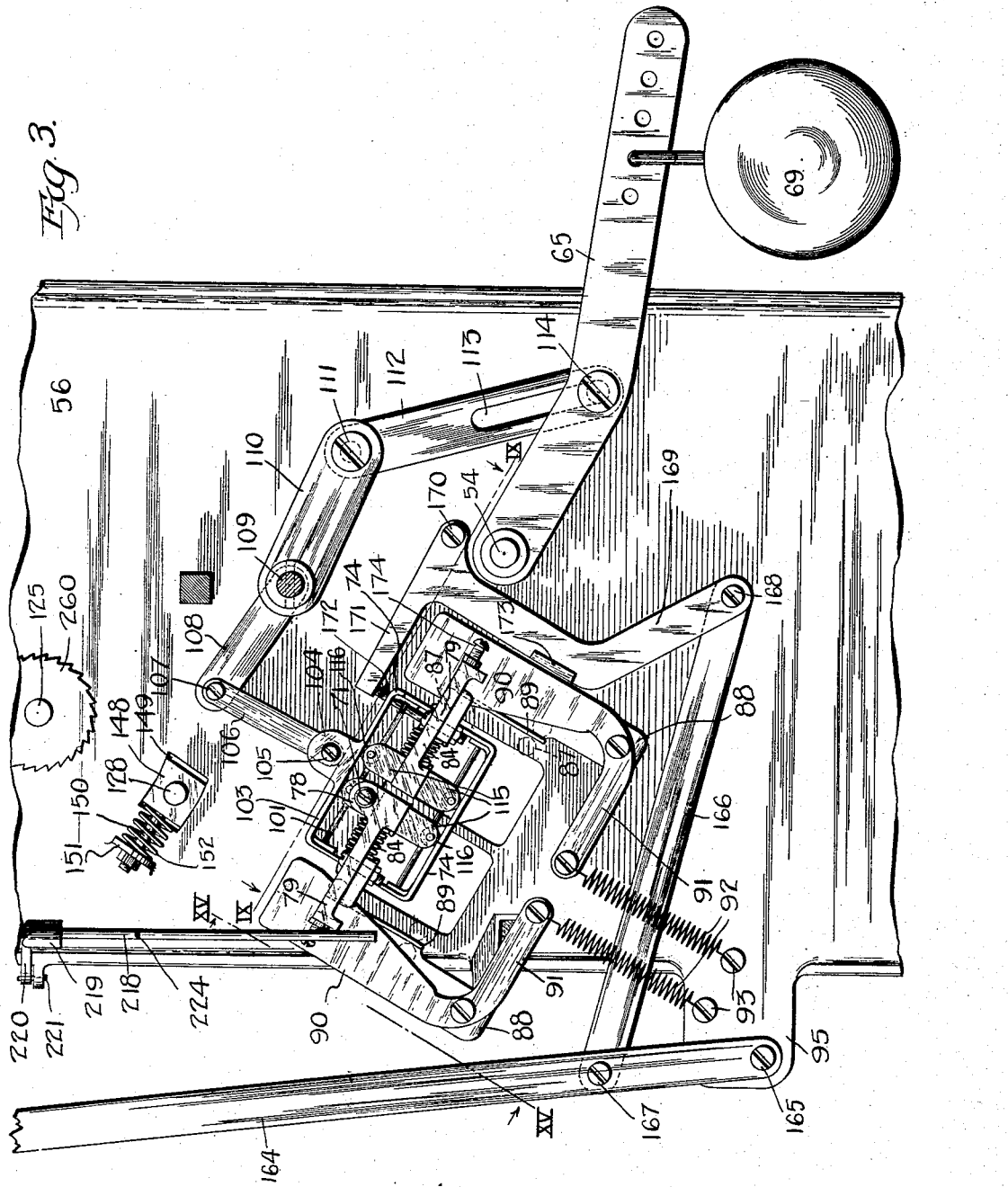

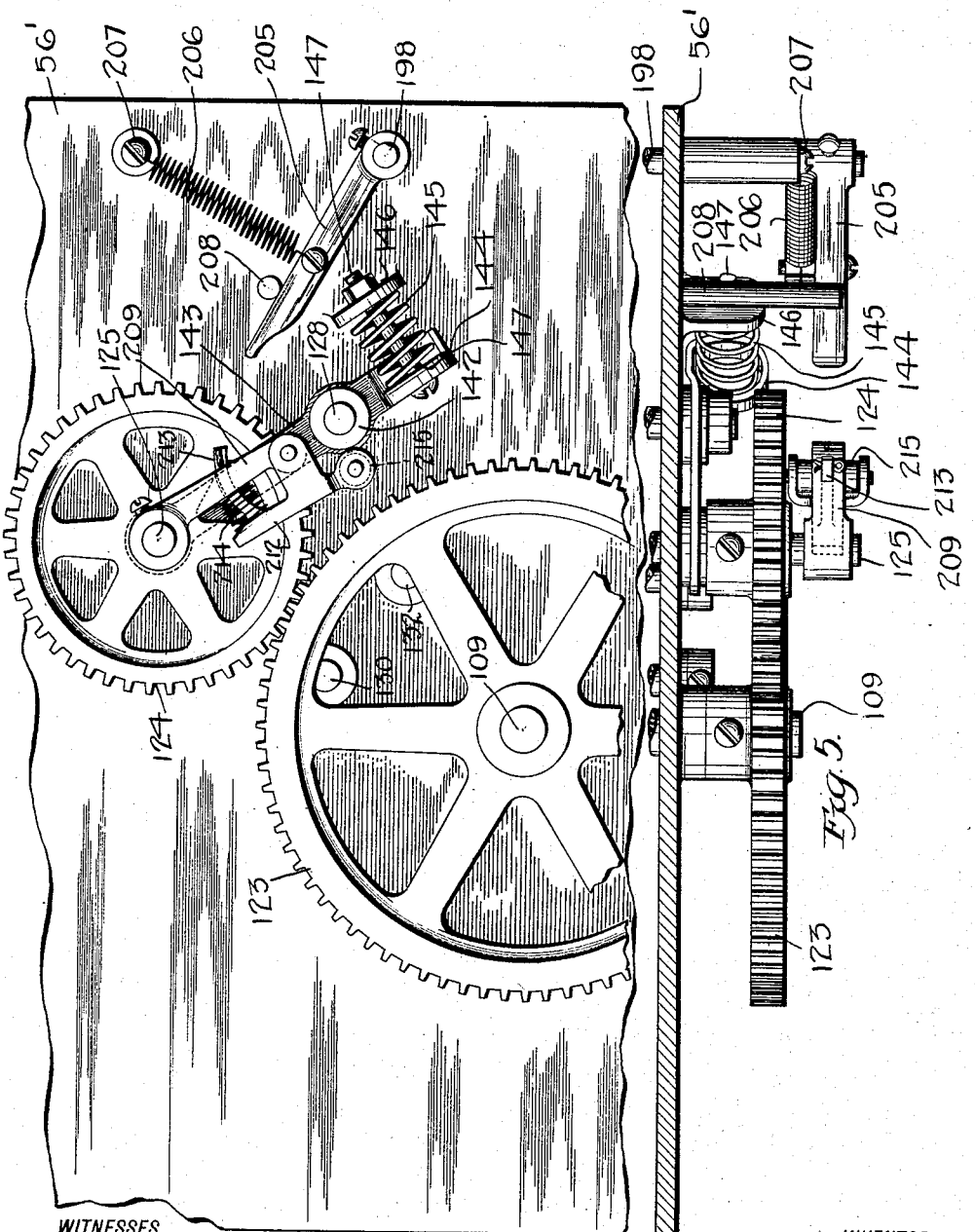

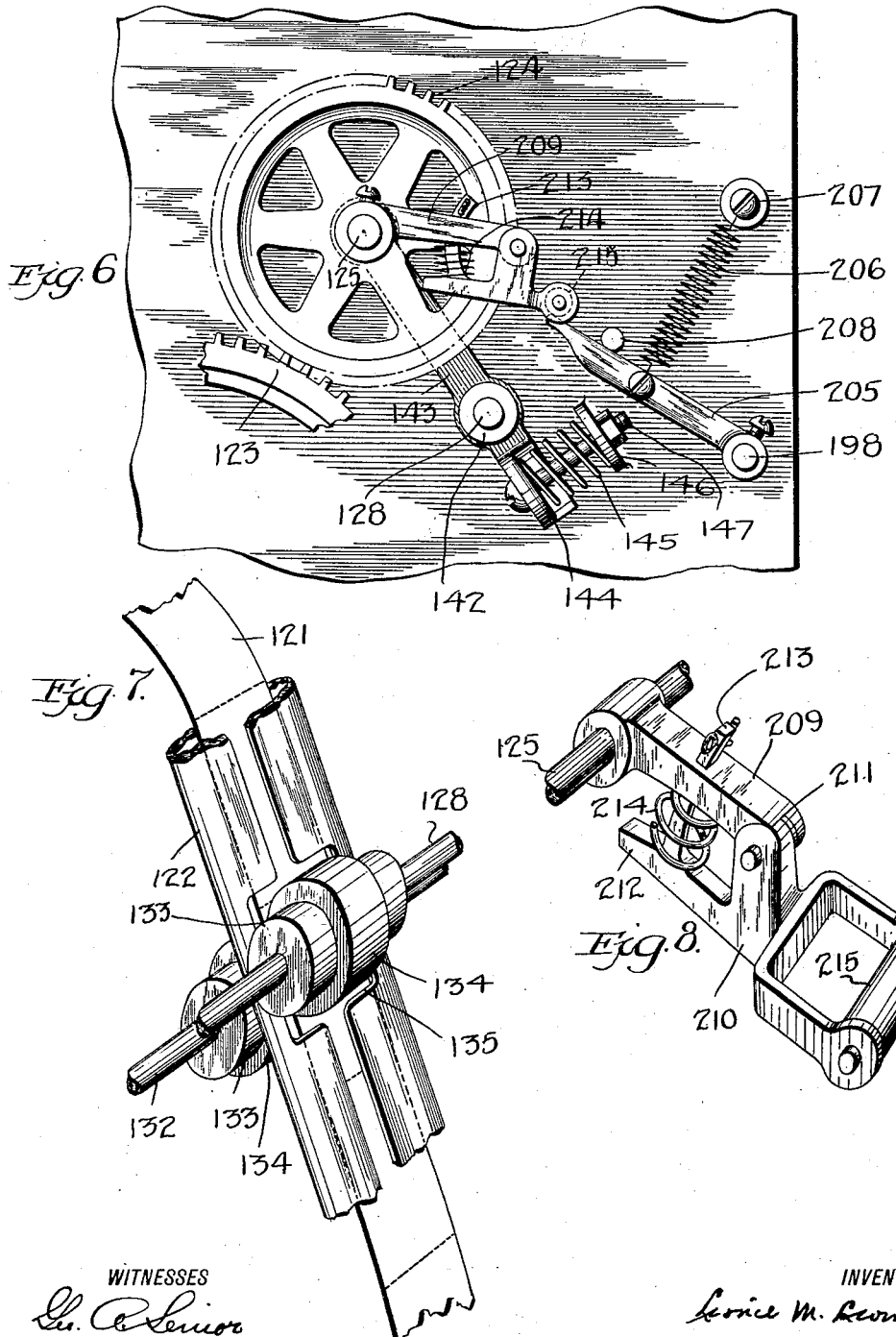

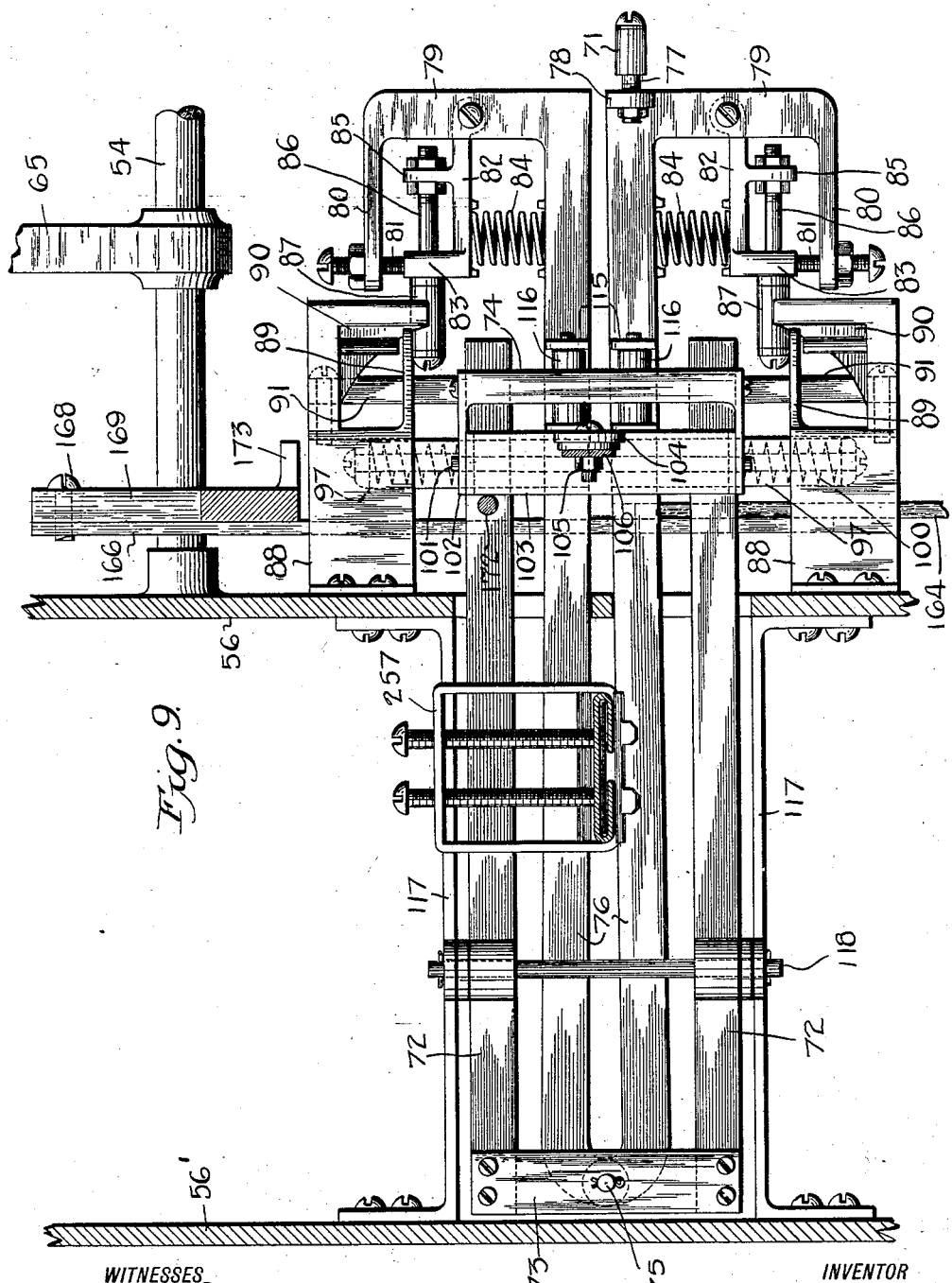

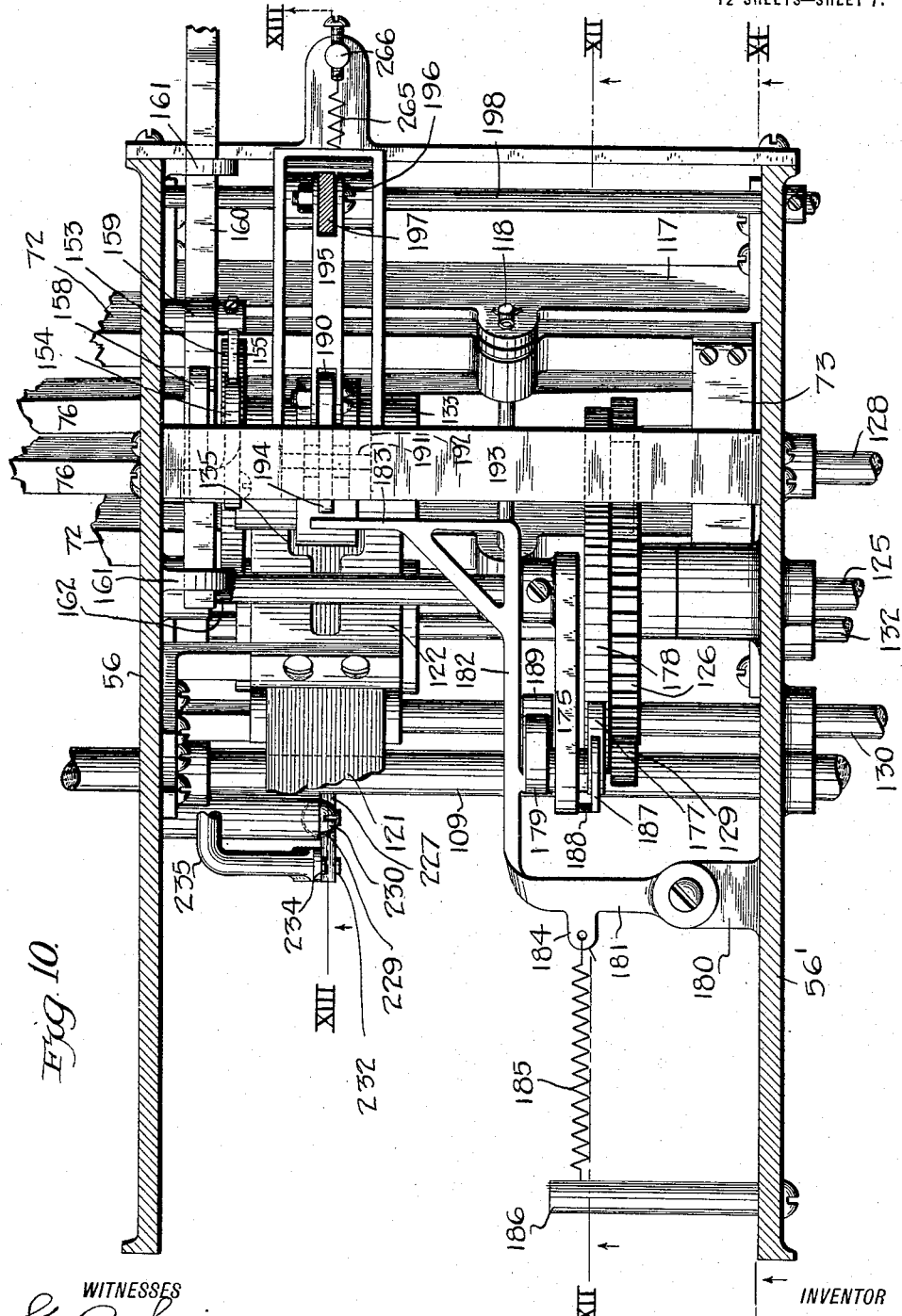

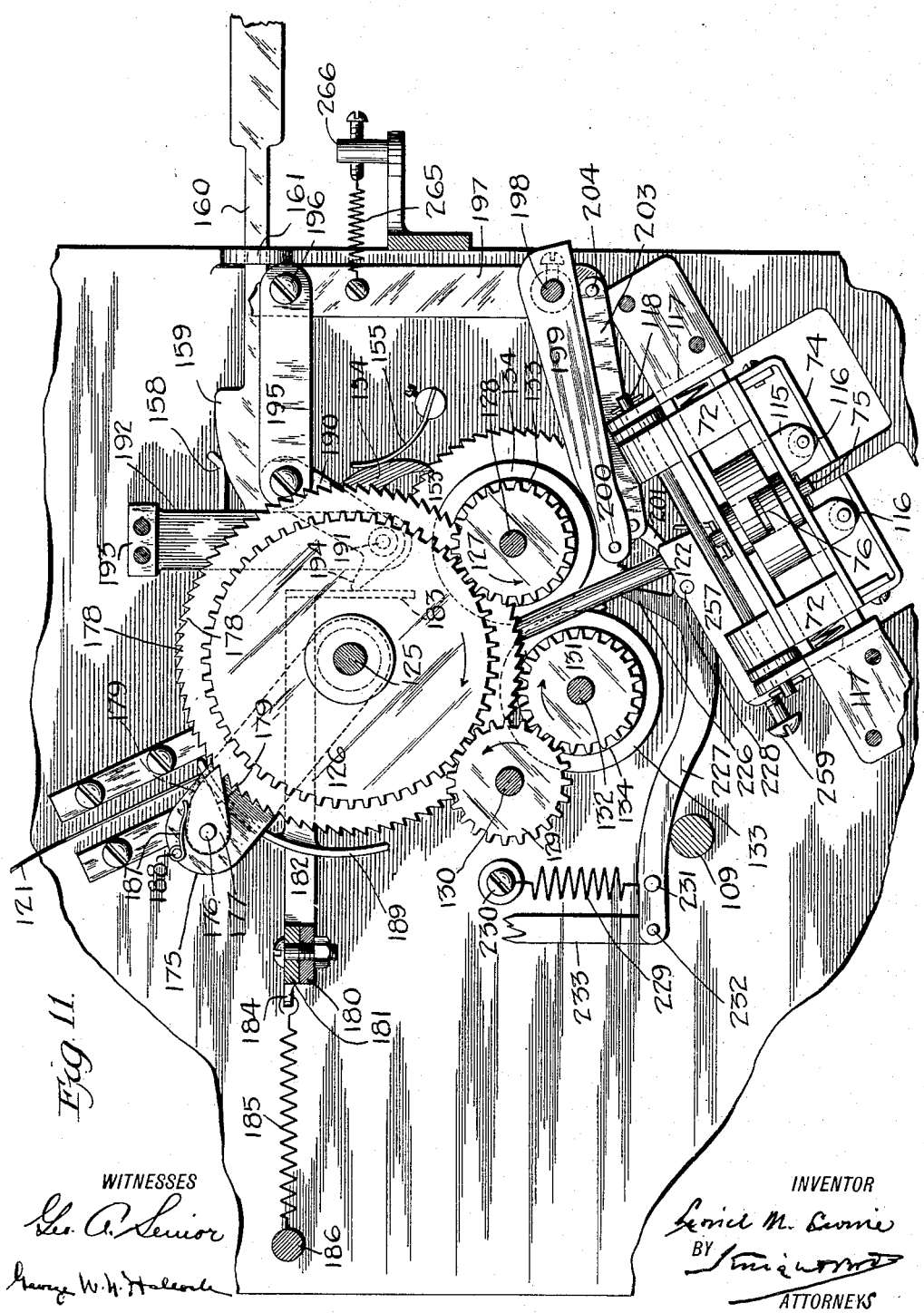

L. M. LEVINE.
VENDING MACHINE OR THE LIKE.
APPLICATION FILED OCT. 5, 1914.
1,171,616.
Patented Feb. 15, 1916.
12 SHEETS—SHEET 9.
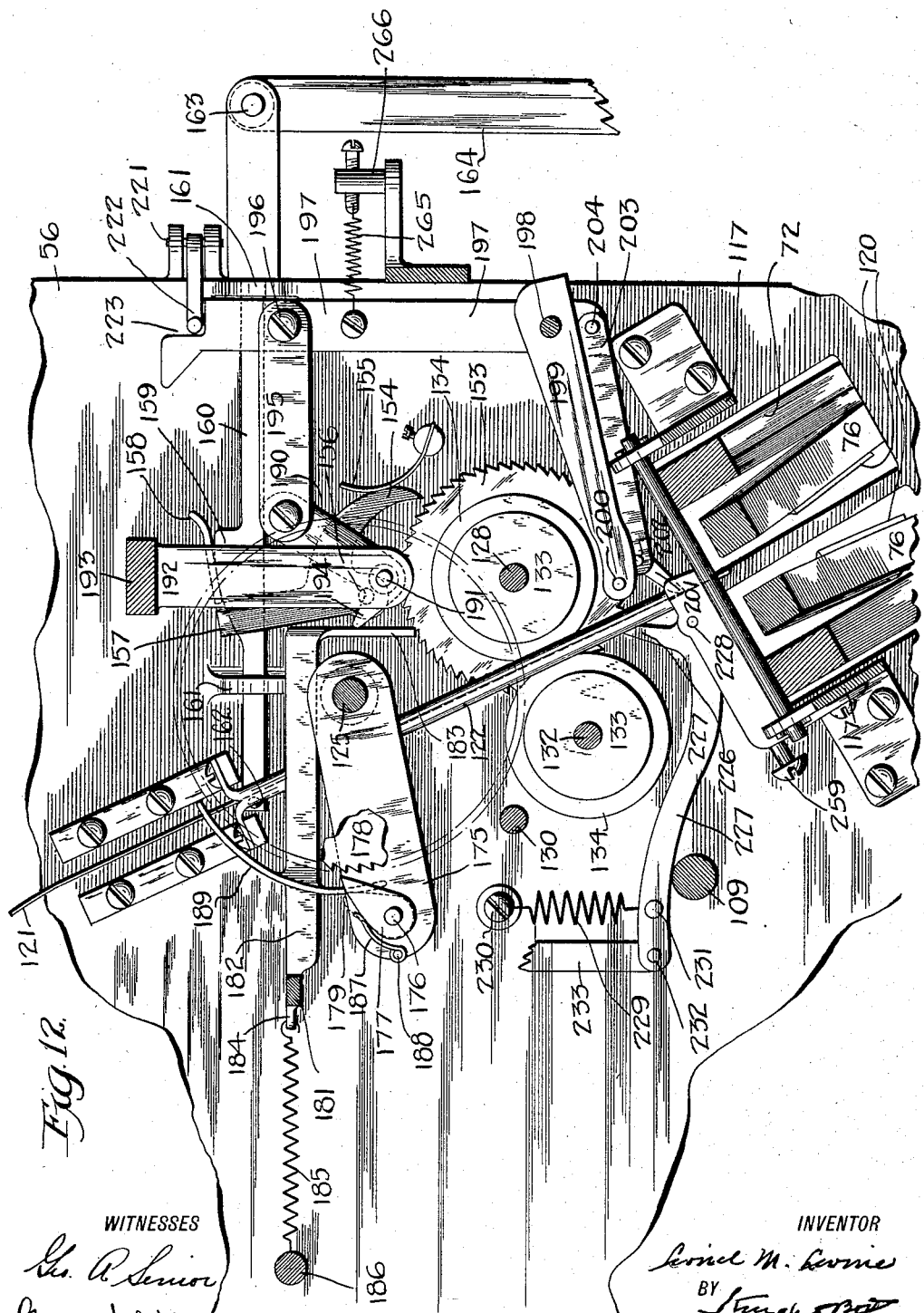

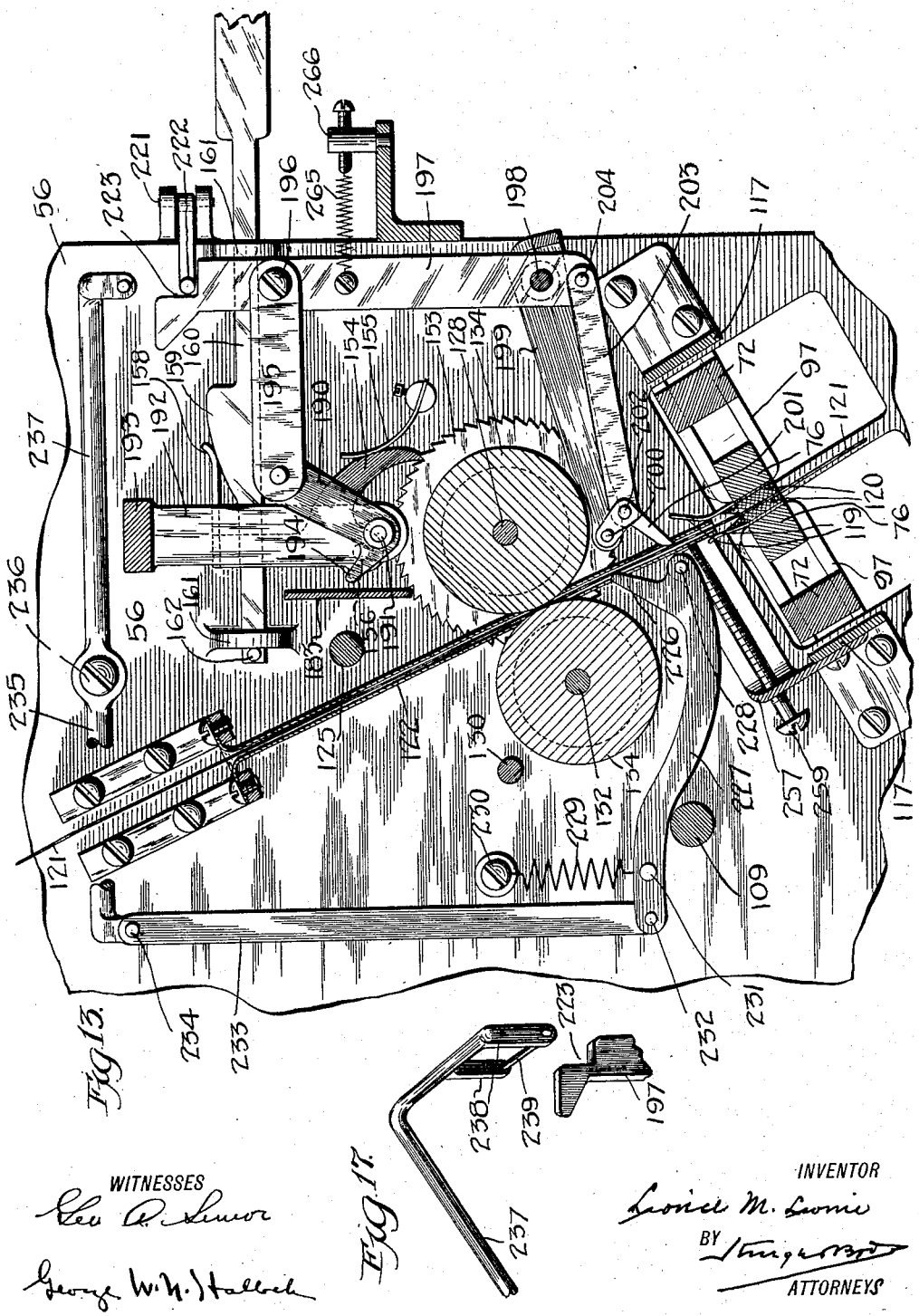

L. M. LEVINE.
VENDING MACHINE OR THE LIKE.
APPLICATION FILED OCT. 5, 1914.
1,171,616.
Patented Feb. 15, 1916.
12 SHEETS—SHEET 11.
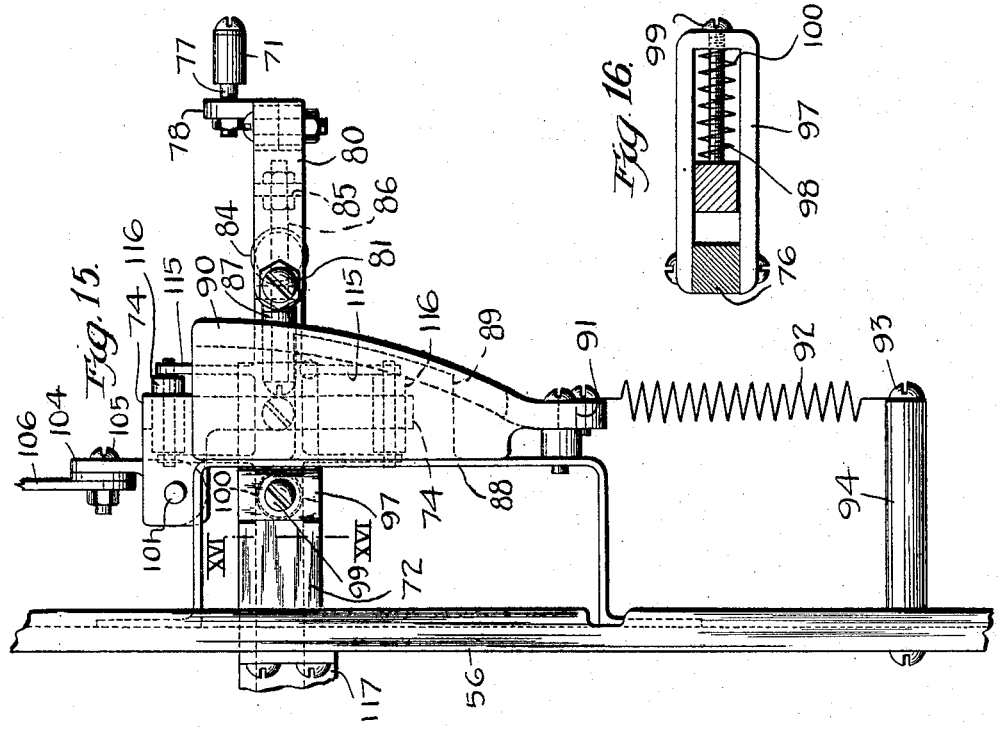
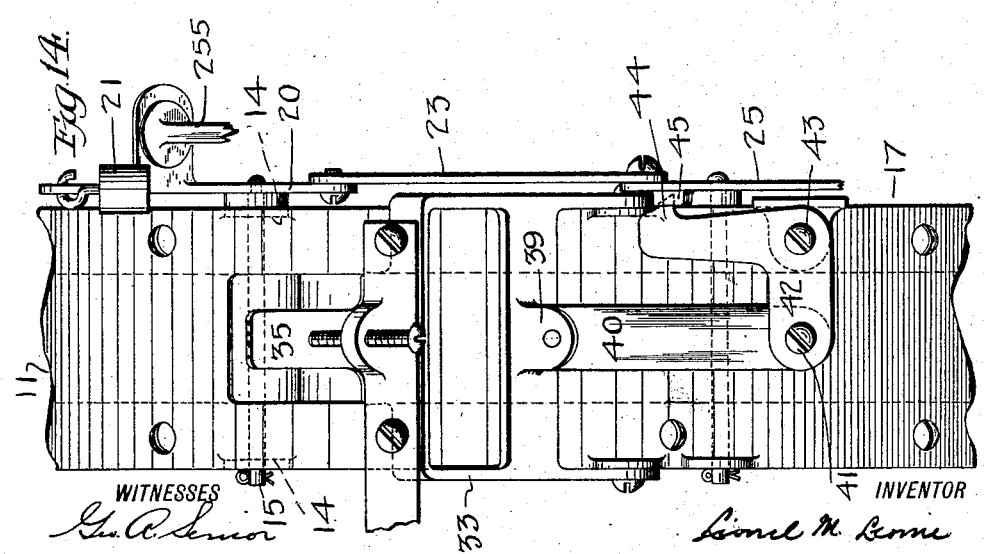
WITNESSES
INVENTOR
BY
ATTORNEYS

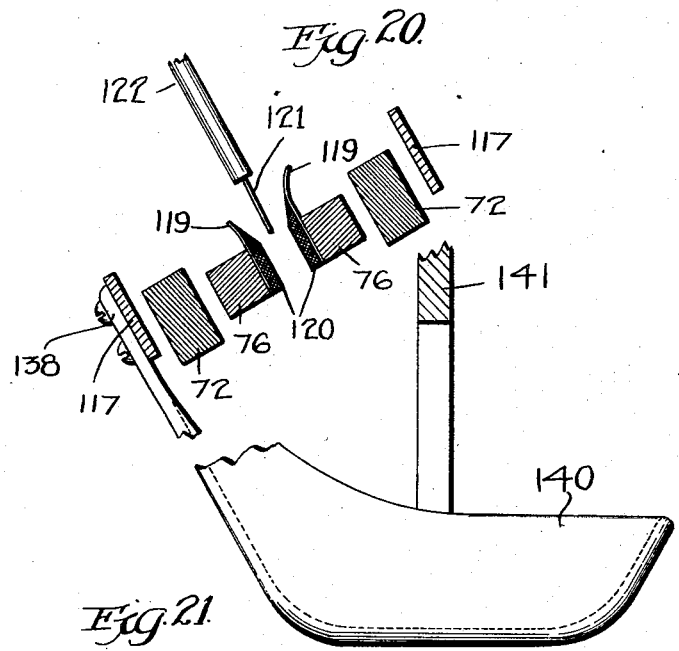
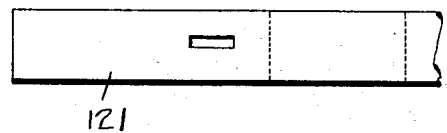
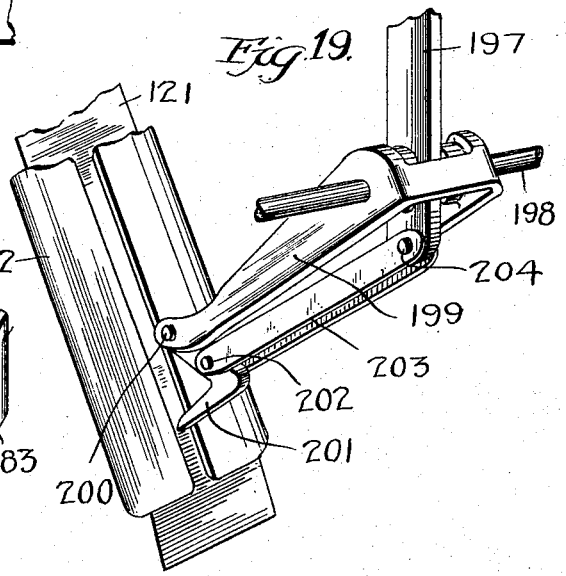

UNITED STATES PATENT OFFICE.

LIONEL M. LEVINE, OF NEW YORK, N. Y.

VENDING-MACHINE OR THE LIKE.

1,171,616.  Specification of Letters Patent.  Patented Feb. 15, 1916.

Application filed October 5, 1914. Serial No. 865,191.

*To all whom it may concern:*

Be it known that I, LIONEL M. LEVINE, a citizen of the United States, and residing in the borough of Manhattan, city, county, and State of New York, have invented certain new and useful Improvements in Vending-Machines or the like, of which the following is a full and clear specification.

This invention relates to machines for delivering one or more articles at a time from a storage chamber or source of supply.

As an exemplification of my invention, the drawings show a vending machine for tickets or the like which are preferably connected together to form a web or tape.

The primary object of the invention as exemplified in a ticket vending machine, is to provide in a machine of this character, improved means for feeding, detaching, and delivering a predetermined number of tickets at each operation of the machine.

One of the objects of the present invention is to provide improved means for making the ticket feeding, detaching and delivering means directly subject to suitable check handling mechanism while at the same time making the check handling apparatus directly subject to conditions in the feeding, detaching and delivering mechanism.

Various features of control and operation will be referred to in the main body of the specification and be pointed out in the appended claims, reference being had to the accompanying drawings, in which,—

Figure 1:
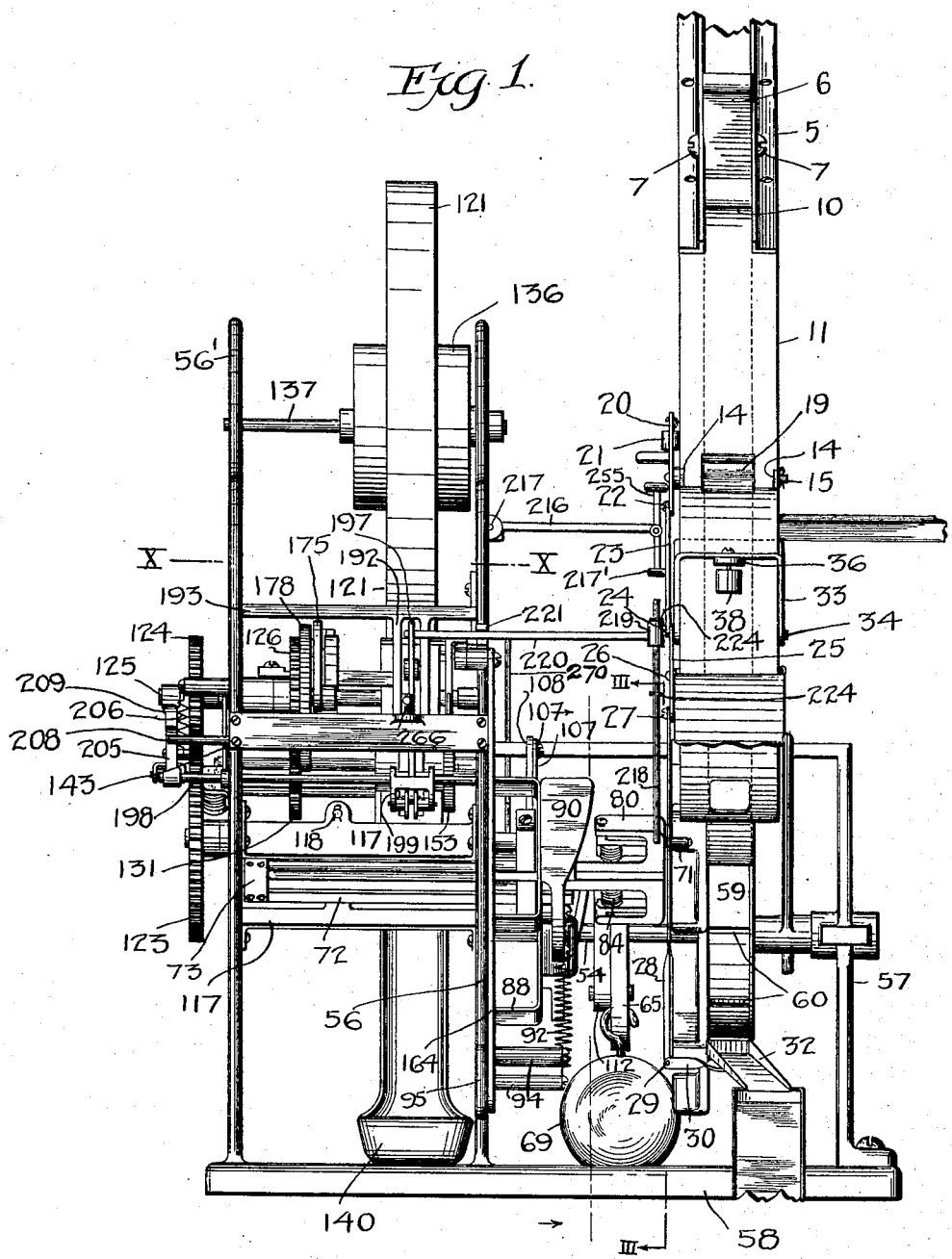
Figure 2:
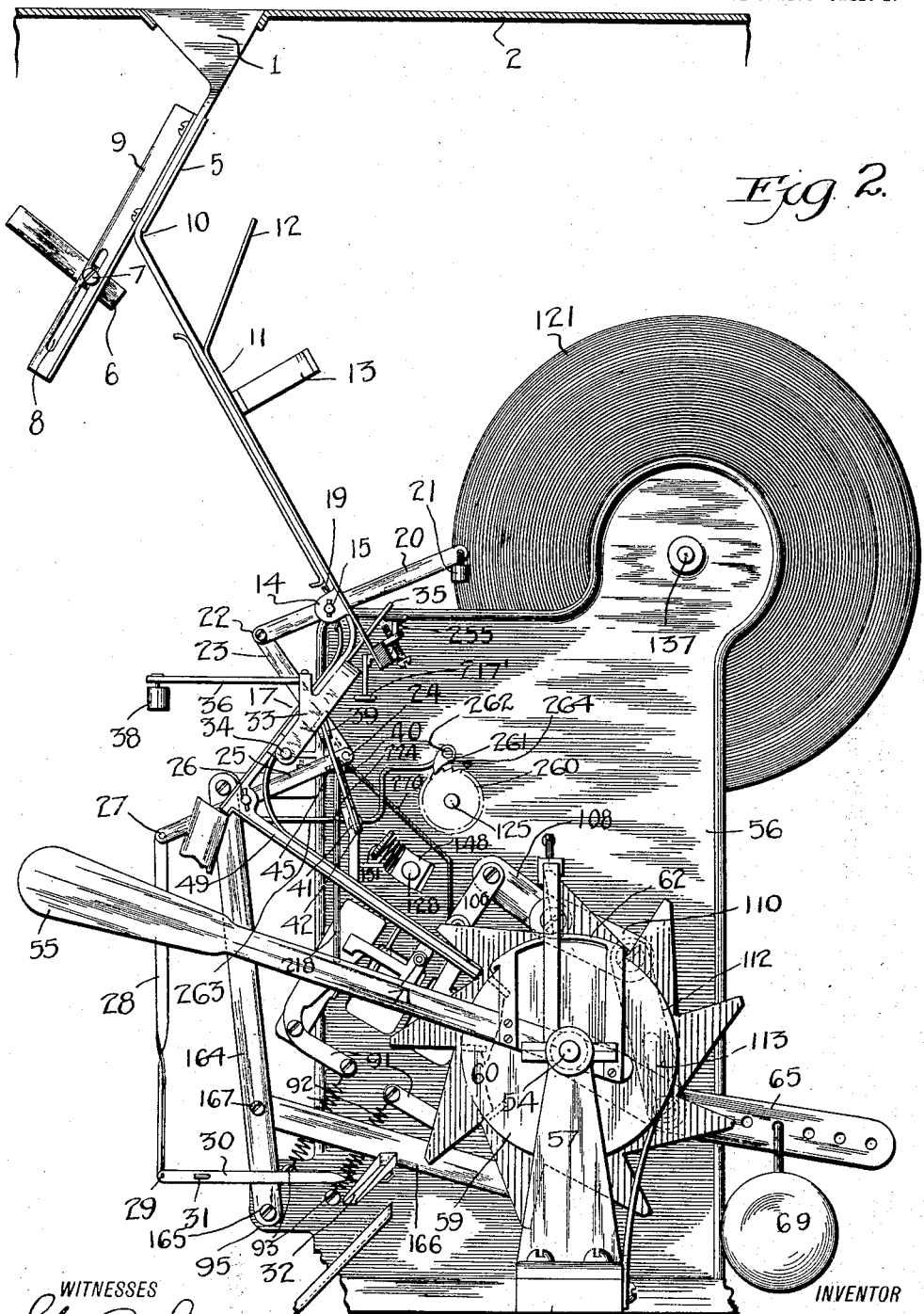

Figure 1 is a front elevation of a ticket vending machine embodying the principles of the present invention; Fig. 2 is a side elevation of the same; parts being broken away; Fig. 3 is a sectional elevation taken on the line III—III of Fig. 1 looking in the direction of the arrows; Fig. 4 is a partial side elevation looking at the side opposite to that shown in Fig. 2; Fig. 5 is a top plan view of the same; Fig. 6 is a fragmentary side elevation similar to Fig. 4, showing the parts displayed by the operation of the machine; Fig. 7 is a detailed perspective view showing a portion of the ticket guide and the feed rollers in their relations thereto; Fig. 8 is a detailed perspective view of the spring trigger arm shown in Fig. 6; Fig. 9 is a sectional view on the line IX—IX of Fig. 3 looking in the direction of the arrows; Fig. 10 is a section on the line X—X of Fig. 1, showing the ticket feeding mechanism in plan view, parts being broken away and parts shown in section; Fig. 11 is a sectional view on the line XI—XI of Fig. 10 looking in the direction of the arrows, parts being broken away; Fig. 12 is a sectional view on the line XII—XII of Fig. 10, looking in the direction of the arrows, parts being broken away; Fig. 13 is a sectional view on the line XIII—XIII of Fig. 10, looking in the direction of the arrows; Fig. 14 is a fragmentary detailed elevation looking at the rear of the check chute; Fig. 15 is a partial side elevation on the line XV—XV of Fig. 3, looking in the direction of the arrow; Fig. 16 is a detailed section on the line XVI—XVI of Fig. 15; Fig. 17 is a detail in perspective of part of the reset locking device; Fig. 18 is a detailed perspective view showing one of the members of the ticket feeding mechanism; Fig. 19 is a detailed perspective view showing the feeler finger and its connecting mechanism; Fig. 20 is a fragmentary section showing portions of the ticket guide and chute, parts being broken away and parts shown in section; Fig. 21 is a fragmentary plan view of one end of the ticket web.

The drawings represent an adaptation of my invention to a ticket vending machine comprising in general a supply of tickets in a web, means for feeding said web and for detaching the tickets from the web and depositing them in a chute which delivers the same to the buyer, a check controlled apparatus for operating the ticket-feeding and detaching means, and various other devices connected with and related to the coöperation of these mechanisms. For the sake of convenience, the machine as a whole will be described as far as possible in the order of operation of its parts, the check-handling mechanism, however, being referred to only in a general way as such mechanism constitutes the subject matter of my co-pending application, Serial Number 865192. Thus in Fig. 2 is shown a hopper 1 for the reception of a coin or check which is preferably arranged in the top wall 2 of the housing for said machine. Leading from the hopper 1 is a section 5 of the chute which conveys the check or coin to a hard, metallic block or pad 6 against which it strikes on edge under the momentum of its fall and rebounds. Said block 6 is adjustably mounted by set screws 7 passing through slots 8 in guides which are rigidly secured to the section 5 in the chute. Said section 5 is connected by a bend 10 with the section 11 of the chute which is provided with an upwardly deflected shield plate 12 to intercept the check or coin which rebounds from the elastic block 6.

Arranged adjacent the upper wall of the section 11 of the chute is a magnet 13 for the purpose of retarding the movement of articles like iron slugs, the purpose being to sufficiently arrest the momentum of the same so that its impact against the impact gate, to be presently described, will not be sufficient to operate said gate. As shown in Fig. 2, the section 11 of the chute is provided with a pair of forwardly extending ears or lugs 14 within which is journaled a pintle 15, the front wall of the chute at this point being provided with an opening as described in my co-pending application referred to above. Mounted on the pintle 15 is a gate or shutter 19 which is adapted by the oscillation of the pintle 15 to be moved into and out of position to eject the coin or check from section 11 of the chute to prevent an operation of the machine in the manner pointed out in said application. Rigidly secured to the pintle 15 is a lever 20 on the rear arm of which is suspended a weight 21. The forward arm of said lever is pivotally connected at 22 to a connecting rod 23 which as shown in Fig. 2 is in turn pivotally connected at 24 with one arm of a lever 25 pivotally mounted at 26. The gate or shutter 19 is returned to normal position by the lever 25 which is pivotally connected at 27 to the upper end of a connecting rod 28, the lower end of said rod being connected at 29 to a lever 30 provided with a pivot 31 by means of which it is fulcrumed in suitable bearings (not shown on the drawings). On the inner end of the lever 30 is a scale pan 32 which is disposed in the path of a falling check or coin which has been excluded from the wheel, thus adapting the system of levers just described to return the gate 19 to normal position after it has been operated by an incorrect check or coin. A yoke 33 (see Figs. 2 and 14) is pivoted at 34 and provided with an upwardly presented plate 35 which is adapted to be struck by a coin or check as it drops through the section 11 of the chute. A weight arm 36 is rigidly secured to the yoke 33, said arm 36 having a weight 38 suspended from its forward end as shown in Fig. 2. Yoke 33 is also provided with a slotted lug 39 (see Fig. 14) for the reception of the upper end of a connecting link 40, the lower end of said link being connected at 41 with one arm 42 of an angle lever pivoted at 43 and provided with a detent 44 for engaging a lug 45 on the upper arm of the lever 25. After each reset of the gate 19, the upper arm of the lever 25 is depressed so that the lug 45 is lowered sufficiently to permit the detent 44 engaging the same, said detent being replaced by the action of weight 38. Furthermore, it will be seen that when a check or coin descends through the section 11 of the chute, its impact against the plate 35 will be sufficient to lift the weight 38, thus drawing the detent 44 away from the lug 45 and permitting the gate 19 to assume a position in which another check or coin deposited within the chute before the parts are returned to normal position, would be ejected from said chute.

Referring now to Fig. 2, section 17 of the chute is connected at an angle with the next section 49 of the chute which discharges a check or coin which is correct in every way into one of the slots in the wheel to be presently referred to. Keyed to a shaft 54 (see Fig. 2) is an operating lever 55, said shaft being journaled at one end in the frame 56 and at its other end in a pedestal 57 secured to the base plate 58 of the machine. Freely journaled on the shaft 54 is a wheel 59 which is provided with a plurality of radially disposed slots 60 arranged at suitable intervals to coöperate with a shield 62 mounted on the operating lever 55 for gripping checks or coins. In the normal working of the machine, a check or coin descending through the section 49 of the chute, is deposited in one of the slots 60 in the wheel 59, the shield 62 and lever 55 being then in the position shown in Fig. 2. When lever 55 is forced downwardly, the shield 62 impinges on the protruding edge of the check or coin and thus imparts an angular movement to the wheel 59.

Referring now to Fig. 9, a pivotally mounted puller frame comprises the lateral bars 72, an end bar 73, and a transverse rectangular frame 74, which rigidly connects the outer ends of the side bars 72. A pin 75 which is carried by the end bar 73 serves as a pivot for the jointed ends of a pair of clamping arms 76, a roller 71 being journaled upon the stud 77 mounted in a lug 78, adjacent the outer end of one of said clamping arms. Each of said clamping arms is provided with a lateral extension 79 provided with a portion 80 extending parallel to the portion 76 of the clamping arm. Threaded in each portion 80 is a transverse screw 81 which constitutes an adjustable abutment for limiting the movement and position of a pressure-equalizing arm 82, which is provided with an outwardly deflected lug 83 which abuts against the end of the screw 81. Interposed between the arm 82 and the adjacent portion 76 of the clamping arm is a spring 84. Said arm is also provided with another lug 85. Carried by said lugs is a pin 86 upon which is journaled a roller 87. As shown in Figs. 3, 9 and 15, a pair of brackets 88 are rigidly mounted upon the partition wall 56. Each of said brackets is provided with a rigid track 89 which confine the rollers 87 during the downward movement of the puller frame, thus serving to clamp the ticket between the clamping arms 76. Pivotally mounted on each of said brackets 88 is a plate or bar 90 provided with an arm 91 to which is attached one end of a spring 92, the other end of said spring being secured at 93 to a post 94 mounted on a projection 95 of the partition wall 56. At the end of the downward movement of the puller frame, the rollers 87 are released by the tracks 89 and fly outwardly against the plates or bars 90, suitable mechanism being provided for this purpose as shown in detail in Fig. 16 of the drawings. Thus each of the clamping arms 76 has secured thereto a yoke 97, the arms of said yoke being in slidable engagement with the longitudinal bars 72 of the puller frame. Threaded to each of said bars 72 is a screw 98, the head 99 of said screw being in engagement with the bend in the yoke 97. Interposed between each of the bars 72 and the outer end of the yoke 97 is a spring 100. During the downward movement of the puller frame these springs exert a constant tendency to separate the clamping arms 76. The upward movement of said ticket pulling frame is produced by the weight 69 and by means of the following mechanism.

Referring to Figs. 3, 9 and 15, a pin 101 is carried by the oppositely disposed extensions 102 of the transverse frame 74. Upon this pin is journaled a bifurcated link 103 provided with a lobe 104, to which is pivotally connected at 105 a link 106 (see Fig. 3), the upper end of said link being pivoted at 107 to an arm 108 which is keyed to the shaft 109. Also keyed to the said shaft 109 is lever arm 110 to which is pivoted at 111, one end of a link 112 which is provided with a slot 113. A stud 114 which is carried by the weight lever 65, slides in the slot 113, and permits the operating arm to be depressed without forcing the puller frame down or oscillating the shaft 109 when there is no check or coin in the wheel. Hence the return movement of the weighted arm does not feed the ticket web. By an inspection of Fig. 9 it will be seen that the outer ends of the arms 76 are provided with suitable brackets 115, within which are journaled suitable anti-friction rollers 116 which run on the upper member of the transverse frame 74. Similar rollers are suspended from the lower face of the clamping arms 76 which run on the lower member of said frame 74. The puller frame may be suitably mounted by arranging cross bars 117 between the partition walls 56 and 56' as shown in Fig. 9, a pintle 118 being provided for journaling said puller frame.

As shown best in Fig. 20, each of the clamping arms 76 is provided with an upwardly extending guard 119, said guards being deflected away from each other. On the inner faces of said guard, are pads 120 which are adapted to periodically engage the lowermost ticket of a web 121 which is being fed downwardly through a guide 122. The shaft 109 shown in Figs. 3, 4, 11, 12 and 13 extends through the partition walls 56 and 56' having keyed thereto a large gear 123 shown best in Figs. 4 and 5. Said gear 123 is in mesh with pinion 124 which is keyed to a shaft 125. Shaft 125 is journaled within the partition walls 56 and 56', and as shown in Fig. 4 journals a gear 126 which meshes with a pinion 127 on a feed roller shaft 128. An idler gear 129 is also in mesh with the gear 126, said idler being mounted on a shaft 130, thus serving to transmit power to a second pinion 131 keyed to the feed roller shaft 132.

As shown best in Fig. 7, each of the feed roller shafts 128 and 132 carries a feed roller embodying an elongated hub portion 133 and a relatively short faced cylindrical portion 134. Said cylindrical portions 134 coöperate to engage the opposite faces of the tickets to feed them from any suitable storage place. For this purpose, guide 122 is provided with apertures 135 of sufficient size to permit the operation of the cylindrical portions 134 of the feed rollers upon the web 121. In the preferred embodiment of my invention, the web 121 is mounted in a roll on a drum 136 (see Figs. 1 and 2), said drum being carried by a shaft 137 suitably mounted in the side walls 56 and 56'. As each ticket is separated from the web, it drops into a chute, a fragmentary portion of which is shown in Fig. 20 having its upper end 138 secured to the cross bar 117, its lower end terminating in a basin or receptacle 140, which projects through the front wall 141 of the machine in suitable position to be accessible to the purchaser. In the preferred embodiment of my invention, the feed roller spindle 132 is journaled within the side walls 56 and 56'. The spindle 128 on the other hand has one end journaled in a bearing 142 (see Fig. 4), carried by an arm 143 which swings about the axis of the shaft 125. The outer end of the arm 143 is provided with a seat 144 for a spring 145, the other end of said spring being in abutment with a disk 146 which is movably connected to the disk 144 by means of a bolt 147. The disk 146 is fixed to a side frame 56'. As seen in Fig. 3, the other end of the shaft 128 is journaled in a block 148 which is slidably mounted in an arcuate slot 149 in the side wall 56, said block being extended beyond said side wall and provided with a bolt 150, which extends through a hole in the lug 151 which is retained on the side wall 56. A spring 152 is interposed between the block 148 and the lug 151, the combined effect of the springs 145 and 152 is therefore applied to force one of the feed rollers 134 toward the other. Referring now to Figs. 11, 12 and 13, the spindle 128 has keyed thereto a ratchet 153 with which the dog 154 is adapted to engage under the pressure of a leaf spring 155. The dog 154 is pivoted on a pin 156 projecting inwardly from the side wall 56 and is provided with an upwardly extending arm 157 having a forwardly extending finger 158 suitably disposed to be engaged by a cam 159 carried by a bar 160 which is reciprocably mounted in bearings 161, said bar being provided with a stop pin 162 for limiting its forward movement. The forward end of the bar is pivotally connected at 163 to the upper end of a lever arm 164. As shown in Fig. 3, said lever arm is pivoted at 165 to the extension 95 on the side wall 56. A connecting rod 166 has its forward end connected at 167 to the lever arm 164, its rear end being connected at 168, to the depending arm 169 of a bent lever which is pivoted at 170 on the side wall 56. Said lever is provided with a forwardly extending arm 171 which carries a depending pin 172, said pin being adapted to be engaged by one of the clamping arms on its return upward movement. The central portion of said lever is provided with a contact plate 173 which is suitably disposed to be struck by the screw 174 carried by the nearer clamping arm. The function of this device just described is as follows: When the ticket pulling frame descends, the rollers 87 are released at the lower end of their travel to permit the clamping arms to fly apart in the manner already referred to. It is then that the screw 174 is driven against the plate 173, causing the lever arm 169 to be moved to the right about its pivot 170. As a result the cam 159 is thrown to the left as shown in Fig. 13, thus causing the dog 154 to be lifted out of engagement with the ratchet 153 and leaving the feed rollers free to be rotated during the return upward movement of the puller frame by means of the mechanism, parts of which have been described, and parts of which are to be described.

As shown in Figs. 2 and 3, the shaft 125 projects outside of the wall 56 and has keyed thereto a ratchet 260 which may be locked by a dog 261 which is pivoted at 262 on the wall 56. A double bend rod 263 is suitably connected to the lever arm 164 to adapt it to move the dog 261 into engagement with the ratchet 260 whenever said lever arm is moved inwardly by the sudden outward movement of the right hand clamping arm (see Fig. 3). At other times, the leaf spring 264 holds said dog away from the ratchet 260. It will be seen therefore that during the return upward movement of the puller frame the feed rolls 134 which receive their movement from shaft 125, will be held against retrograde movement but adapted to impart a forward feed movement to the web. The feed roller movement takes place during the upward stroke, the latter part of said stroke causing the arm 171 to be lifted by the puller frame engaging the pin 172 thus returning the cam 159 to its forward position shown in Fig. 13 and dropping the dog 154 into engagement with the ratchet 153 and locking it against further feeding movement until the puller frame has again been forced downwardly.

Referring now to Figs. 11, 12, 13 and 19, mechanism for transmitting power from the shaft 125 is an oscillatory arm 175 which carries a pin 176 upon which is journaled a pawl 177, said pawl being adapted to engage a ratchet 178 which is secured to the gear 126. The pintle 176 extends through the other end with a cam arm 179 (see Figs. 10 and 11). Projecting inwardly from the side wall 56' is a lug 180 to which is pivoted a rear arm 181 of a lever 182, said lever being provided with a forward arm 183. The rear arm 181 of said lever is provided with a lug 184, to which is attached one end of a spring 185, the rear end of said spring being secured to a post 186 projecting from the side wall 56'. A leaf spring 187 which is mounted on a post 188 bears down on the pawl 177, tending to retain said pawl in engagement with the ratchet 178. A cam plate 189 which is rigidly mounted on the central portion of the lever 182 is made of some such form as that shown in Fig. 12, i. e., the upper end is deflected inwardly toward the shaft 125. The strength of the leaf spring 187 is such as to overcome the tension of the spring 185 sufficiently to retain a lever 182 as far forward as possible. It will be understood from an inspection of Fig. 12 that as the arm 175 is oscillated downwardly, the pawl 177 will be lifted out of engagement with the ratchet 178 as it goes forwardly will again become engaged therewith. It will be evident that the extent of the angular movement during which pawl 177 is in engagement with the ratchet 178 will be either greater or smaller depending upon whether the cam plate 189 is nearer the front or farther therefrom, inasmuch as the pawl 177 comes into engagement with ratchet 178 relatively late when cam 189 is held against forward movement by the ticket controlled finger 194. Suitable means for predetermining the position of the cam plate 189 and thereby regulating the amount of feed imparted to the web of tickets, are provided as follows. Referring now to Figs. 12 and 19, a lever arm 190 is pivoted on a pin 191 carried by a hanger 192 which is rigidly mounted on a cross bar 193 extending between the side walls 56 and 56'. Said lever is provided with an angularly disposed finger 194 which is adapted to abut against the forward arm or plate 183 of the lever 182. A link 195 has its rear end connected to the arm 190 and its forward end connected at 196 to a lever arm 197 which is loosely pivoted on a shaft 198 which is journaled in the side walls 56 and 56'. Keyed to the shaft 198 is a yoke 199 which carries at its rear end a pin 200. A caliper finger 201 is provided with a substantially right angle bend which is pivotally connected at 202 with the rear end of a connecting link 203, the forward end of said link being pivotally connected at 204 with the lower end of said lever 197. The shaft 198 extends beyond the side wall 56' and as shown in Fig. 5, has secured thereto an arm 205. A spring 206 which is secured at 207 to the side wall 56', has its other end secured to the arm 205 and normally retains it in upward position against a stop 208. The shaft 125 has secured thereto a radial arm 209. As shown best in Figs. 6 and 8, said arm 209 has pivotally mounted thereon a roller arm 210, the joint at 211 being suitably formed to prevent relative upward displacement of the arm 210.

A projection 212 carries an arcuate bar 213 which slidably engages the arm 209, being normally retained in the position shown in Fig. 8 by a spring 214 interposed between the arm 209 and the extension 212. The outer end of the arm 210 is bifurcated to mount a roller 215. Whenever the gear 124 is moved in a clockwise direction according to Fig. 6, the roller 215 engages the outer end of the lever arm 205 and depresses it, the effect being to depress the yoke 199 (see Fig. 13) and to momentarily move the finger 201 along the web which is to be fed by the feed rolls 134. During the return movement of the arm 209, the spring 214 permits a downward relative movement of the arm 210 so that the roller 215 is returned to its position above the arm 205 ready for the next operation. Referring more especially to Figs. 4, 13 and 19, it will be understood that every time the arm 205 is forced downwardly, it oscillates the shaft 198 which occasions a downward movement of the yoke 199. By reason of this movement, the gage finger 201 travels downwardly along the ticket web until it reaches the bottom thereof when it immediately moves to the left about its pivot 200 (see Fig. 13) and permits the spring 265 which connects the lever arm 198 to a post 266, to pull said lever arm to the right. This movement withdraws the finger 194 and permits a forward movement of the cam 198 which in turn permits the pawl 177 to engage the ratchet 178. In consequence the amount of the feeding movement imparted to the ticket web by rollers 134, will correspond to and be governed by the position of the lower edge of the next ticket to be detached and delivered.

Referring now to Figs. 1, 2 and 13, suitable mechanism for resetting the lever 20 is provided. To reset the lever 20 to move the gate 10 into operative position shown in Fig. 2, a lever arm 216 is pivoted at 217 to the side wall 56. At the outer end of said lever arm 216 is mounted a depending pad 217' which is adapted to be engaged at certain intervals by a rod 218 which is reciprocably mounted in a bearing 219 carried by the outer end of one arm 220 of a lever which is pivoted at 221 and provided with a bent arm 222 which engages in a notch 223 in the upper end of a lever arm 197 (see Fig. 13). By an inspection of Fig. 12, it will be noted that the lever arm 222 is free to move forward independently of the lever arm 197, thus permitting the lever 197 to return without bringing arm 222 with it. Suitable and efficient means for returning this lever to its former position, may be provided by securing a rod 270 (see Figs. 1 and 2) to the lever arm 220, the lower end of said rod 270 being deflected to dispose it in a position to be engaged by one of the puller arms 79 on its inward movement at the end of its up stroke. The rod 218 is provided with stop pins 224, which limit its upward and downward movements. It will be understood from the description of the mechanism for rocking the arm 197, that when said arm moves inwardly, the rod 218 will be moved out of alinement with the depending pad 217 and vice versa, when said lever 197 is moved forwardly the rod 218 will be moved into the path of the pad 217 so that the extension 79 of the clamping arm 76 will lift the rod 28 on its return upward movement and force the upper arm 255 into engagement with the lever 20. Referring now to Fig. 13, should the tickets be exhausted from the machine, the finger 226 which is carried by a lever 227 pivoted at 228, would be moved forwardly by a spring 229 secured at one end at 230 and having its other end secured at 231 to the lever 227. Pivotally connected at 232 to said lever is a connecting link 233 which has its upper end connected at 234 to one arm 235 of a lever which is pivoted at 236 on the side wall 56. The forward end 237 of said lever carries spaced arms 238 as shown in Figs. 17 and a pin 239 extending between said arms which is adapted to engage the projection 223 on the upper end of lever arm 197. It will be seen therefore that whenever the finger 226 moves forwardly, the pin 239 will drop into position to lock the lever 197, thus preventing the movement of the lever 197 which swings the lever 220 (see Figs. 1 and 2). In consequence, the rod 218 is not thrown into position to cause the operation of lever 20 which moves the shutter 19 into position to provide an open passageway down the chute. Said shutter would thus be held in position to cause every check or coin dropped into the chute to be returned to the would-be purchaser. Suitable means for holding the guide 122 of the ticket web are provided as shown in Figs. 9 and 13 by the bracket 257 which is secured to the cross bar 117. Threaded in the bracket 257 are a pair of screws 259 which may be adjusted into position to clamp the guide 122.

Obviously various modifications in the construction and arrangement of parts could be embodied in machines of this character without departing from the broad spirit of my invention as disclosed on the drawings.

The operation of the machine in its entirety will now be readily understood and briefly described is as follows: Let it be supposed that an invalid coin or check has been deposited in the hopper. According to the disclosure of my co-pending application, Serial Number 865192, it will be eliminated. The correct coin on the other hand will eventually be deposited in one of the slots 60 in the wheel 59 and will protrude therefrom to engage the shield 62 when it is depressed by the hand lever 55, (see Fig. 2). Under these conditions one of the radial arms of the wheel 59 will be forced into engagement with the cam roller 71 carried by the puller frame. As said frame descends, the rollers 87 carried by the clamping arm 76 will be held by the tracks 89 until adjacent to the bottom of their movement when said rollers will be released and thrown outwardly against the plates 90, the weight 69 serving to return the puller frame to initial position. The downward movement of the frame detaches the lowermost ticket from the web, the web being at the time firmly held by the feed rollers 134. During the return movement of the puller frame, the puller arms are held apart by the tracks 89 while the radial arm 175 imparts a greater or less feed movement to the feed rolls 134, depending on the position of the next lowermost ticket in the web. In order to permit this feeding movement, the cam 159 shown in Figs. 13 and 14 has been displaced by the inward movement of the lever arm 164 as described in the body of the specification, thus lifting the dog 154 out of engagement with the ratchet 153. At the same time the rod 263 (see Fig. 2) which is connected to lever 164, forces the pawl 261 into engagement with the ratchet 260 against the pressure of spring 264, thus preventing a reverse movement of the arm 175 during the ticket-feeding operation. At the end of the upward movement of the frame, said lever arm 164 is moved outwardly to permit the dog 154 to engage ratchet 153. This movement of lever arm 164 retracts rod 263 and permits pawl 261 to release ratchet 260. During the ascending movement of the puller frame the arm 205 (see Fig. 7), has caused a depression of the yoke 199 (see Fig. 13) and moved the finger 201 along the lowermost ticket until it drops below the lower edge of said ticket when the feeding movement is begun in the manner already pointed out, the amount of feed due to the feed rolls depending upon the position of the lowermost ticket. The position of each ticket prior to its detachment is thus accurately controlled during the successive operations of the machine. Whenever the ticket roll becomes exhausted, finger gage 226 (see Fig. 13) moves to the right under the action of spring 229, the consequence being that lever arm 237 drops until the pin 239 engages projection 223 on the upper end of lever 197. This prevents the operation of the mechanism which resets the gate or shutter controlling the passageway in the chute. Hence said gate or shutter remains in position to return all checks or coins that are deposited in the machine after it becomes empty.

I claim:

1. In a vending machine, the combination of means for feeding a web, means for detaching a portion of said web, and means for controlling the operation of said feeding means, said controlling means being adapted to have its effect regulated by the position of the forwardly presented edge of the next portion to be detached.

2. In a vending machine, the combination with means for feeding a web, of means for regulating the amount of feed of said feeding means, said regulating means including a part adapted to be engaged by the end of said web for controlling the operation of said regulating means to depend upon the position of the forward edge of said web.

3. In a vending machine, web-feeding means, a shaft geared to said web-feeding means, and means for varying the amount of feeding movement imparted to said shaft from one operation of the web-feeding means to the next.

4. In a vending machine, an oscillatory frame, clamping arms oscillatably mounted on said frame and under tension tending to separate them, means for feeding a web to said clamping arms, means for forcing said clamping arms together during their movement in one direction and for releasing said arms, during their movement in the opposite direction, said means including an adjustable abutment carried by each of said clamping arms and tracks suitably disposed to engage said abutments.

5. In a vending machine, means for feeding articles, means for blocking the feeding movements of said feeding means, means for operating said feeding means periodically, and means for rendering said blocking means inoperative during the periods of rest of said feeding means and rendering said feeding means operative again during the periods of activity of said feeding means.

6. In a vending machine, variable means for feeding articles, means for blocking the feeding movements of said feeding means, means for operating said feeding means periodically, and means for rendering said blocking means inoperative during the periods of rest of said feeding means and rendering said feeding means operative again during the periods of activity of said feeding means, said blocking means being provided with means for timing its movement with respect to the movement of said feeding means.

7. In a vending machine, an oscillatory frame, gripping arms oscillatably mounted on said frame, means for holding said arms in gripping relation to each other during a movement in one direction of said frame, means for forcing said arms apart at the end of said movement, means for returning said frame to normal position, and means for feeding a web thereto from which portions are to be successively detached, said clamping arms being provided with means yieldably tending to force them apart during their movement in the other direction, rollers carried by said arms, and rigidly mounted track members for confining said arms during said movement in one direction.

8. In a vending machine, an oscillatory frame, gripping arms oscillatably mounted on said frame, means for holding said arms in gripping relation to each other during a movement in one direction of said frame, means for forcing said arms apart at the end of said movement, means for returning said frame to normal position, and means for feeding a web thereto from which portions are to be successively detached, said clamping arms being provided with means yieldably tending to force them apart, rollers carried by said arms, and rigidly mounted track members for confining said arms during said movement in one direction, said rollers being oscillatably mounted and provided with yieldable means interposed between them and said clamping arms.

9. In a vending machine, an oscillatory frame, gripping arms oscillatably mounted on said frame, means for holding said arms in gripping relation to each other during a movement in one direction of said frame, means for forcing said arms apart at the end of said movement, means for returning said frame to normal position, and means for feeding a web thereto from which portions are to be successively detached, rollers carried by said arms, and rigidly mounted track members for confining said arms during said movement in one direction, said rollers being oscillatably mounted and provided with yieldable means interposed between them and said clamping arms, and an adjustable abutment carried by each of said clamping arms for limiting the outward movement of said rollers relatively to said clamping arms.

10. In a vending machine, means for feeding articles, means for preventing the movement of said feeding means during the periods of rest of said feeding means, and means under the control of said feeding means for operating said preventing means.

11. In a machine of the character described, web-feeding means, means for detaching portions of said web, means for imparting more or less movement to said web-feeding means, a gage-finger movable relatively to said web and at times contacting with said web, and means operated by said gage-finger for modifying the action of said web feeding means.

12. In a vending machine, means for storing a supply of tickets, means for retracting tickets from said storing means including a pair of feed rolls, a ratchet keyed to one of said feed rolls, a dog adapted to engage said ratchet to block the feeding movements of said rolls, means for moving said feed rolls periodically, and means for moving said feed dog into engagement with said ratchet during the periods of rest of said feed rolls and for removing said dog prior to the operation of said feed roll moving means.

13. In a vending machine, means for storing a supply of tickets, means for retracting tickets from said storing means including a pair of feed rolls, a ratchet keyed to one of said feed rolls, a dog adapted to engage said ratchet to block the feeding movements of said rolls, means for moving said feed rolls periodically, and means for moving said feed dog into engagement with said ratchet during the periods of rest of said feed rolls and for removing said dog prior to the operation of said feed roll moving means, said dog being provided with a cam arm, and a cam suitably timed with respect to said feed roll moving means to impart said dog-moving movements.

14. In a vending machine, means for holding a supply of tickets, feed rolls for engaging said tickets, means for withdrawing tickets from said feed rolls, a ratchet secured to one of said feed rolls, a dog for said ratchet provided with a cam arm, a cam for operating said cam arm, and means controlled by the movement of said ticket withdrawing means for operating said cam.

15. In a vending machine, means for holding a supply of tickets, feed rolls for engaging said tickets, means for withdrawing tickets from said feed rolls, a ratchet secured to one of said feed rolls, a dog for said ratchet provided with a cam arm, a cam for operating said cam arm, and means controlled by the movement of said ticket withdrawing means for operating said cam, said ticket withdrawing means being adapted to pull a ticket away from said feed rolls while at the same time imparting a swinging movement about an axis transverse to the ticket and to one side thereof.

16. In a vending machine, means for holding a supply of tickets, feed rolls for engaging said tickets, means for withdrawing tickets from said feed rolls, a ratchet secured to one of said feed rolls, a dog for said ratchet provided with a cam arm, a cam for operating said cam arm, and means controlled by the movement of said ticket withdrawing means for operating said cam, said withdrawing means including a puller frame, extending transversely of said tickets, said frame being pivoted along one edge to impart a tearing movement, and means carried by said frame for gripping said tickets.

17. In a vending machine, means for holding a web from which portions are to be detached from time to time, feed rolls adapted to feed said web, a puller frame movable toward and away from said feed rolls, a ratchet secured to one of said feed rolls, a dog for said ratchet provided with a cam arm, a cam for engaging said cam arm, releasable web-gripping means carried by said puller frame, and means adapted to be operated by said web-gripping means for actuating said cam.

18. In a vending machine, means for holding a web from which portions are to be detached from time to time, feed rolls adapted to feed said web, a power shaft geared to one of said feed rolls, a ratchet keyed to said power shaft, a dog for locking said ratchet and power shaft, ticket pulling means including gripping jaws movable toward and away from said feed rolls, and means operated by the movement of said gripping jaws for moving said dog into and out of engagement with said ratchet.

19. In a vending machine, means for holding a web from which portions are to be detached from time to time, feed rolls adapted to feed said web, a power shaft geared to one of said feed rolls, a ratchet keyed to said power shaft, a dog for locking said ratchet and power shaft, ticket pulling means including gripping jaws movable toward and away from said feed rolls, means operated by the movement of said gripping jaws for moving said dog into and out of engagement with said ratchet, a ratchet secured to one of said feed rolls, a dog therefor provided with a cam arm, and a cam for engaging said cam arm adapted to be actuated by the movement of said gripping jaws.

20. In a vending machine, means for holding a web from which portions are to be detached from time to time, feed rolls for feeding said web, a power shaft geared to one of said feed rolls, a ratchet keyed to said shaft, a dog for engaging said ratchet, a ratchet secured to one of said feed rolls, a dog for the second mentioned ratchet, means for detaching portions of said web, said means being movable toward and away from said feed rolls, and means operated by said detaching means for moving said dogs.

21. In a vending machine, an oscillatory frame, gripping arms oscillatably mounted thereon, means for feeding a web of tickets thereto, means for locking the movement of said feeding means and comprising a member suitably disposed to be engaged by said gripping arms adjacent one end of their movement, suitable means for holding said gripping arms together during the movement in the opposite direction, said means being adapted to release said arms adjacent to the end of their movement, and means suitably disposed to be engaged by one of said arms for releasing said web feeding means.

22. In a vending machine, an oscillatory mechanism adapted to deliver articles to be vended, means for periodically operating said mechanism to oscillate it, means for returning said mechanism to initial position, and means operated by said returning means for delivering the articles to said oscillatory mechanism.

23. In a vending machine, an oscillatory mechanism adapted to deliver articles to be vended, means for periodically operating said mechanism to oscillate it, means operated by said operating means for returning said mechanism to initial position, and means adapted to receive power from said returning means for feeding said articles to said oscillatory mechanism.

24. In a vending machine, a pair of feed rollers adapted to feed a ticket web, an oscillatory frame arranged adjacent to said rollers, clamping arms carried by said frame, oppositely disposed tracks for holding said arms together during their movement in one direction, a member adapted to be engaged and displaced by one of said arms during its return movement, means for locking said feed rollers and means for connecting said locking means to said movable member having an element suitably disposed to be engaged by said frame adjacent the end of its return movement to lock said locking means, said locking means being moved into unlocked position by the outward movement of said member.

25. In a vending machine, a pair of feed rollers, locking mechanism therefor, an oscillatory frame, clamping arms pivotally mounted on said frame, fixed tracks for holding said arms in clamping position during their movement away from said rollers, a lever adapted to be moved in one direction by one of said arms and in the opposite direction by the return movement of said frame, and means for connecting said lever to said locking means.

26. In a vending machine, an oscillatory ticket pulling device adapted to grip the ticket while moving in one direction and to release said ticket while moving in the opposite direction, an oscillatory shaft connected to said device, means for moving said device in one direction, yieldable means for returning said device to normal position and means for connecting said yieldable means to said oscillatory shaft.

27. In a vending machine, an oscillatory ticket pulling device adapted to grip the ticket while moving in one direction and to release said ticket while moving in the opposite direction, an oscillatory shaft connected to said device, means for moving said device in one direction, yieldable means for returning said device to normal position and means for connecting said yieldable means to said oscillatory shaft, said connecting means being provided with a lost motion joint.

28. In a vending machine, a device for pulling tickets from a web of tickets, oscillatory means for imparting the ticket pulling movement, means for returning said movement imparting means to initial position, means for feeding a ticket web to said ticket pulling device, and means for connecting said oscillatory means to said web-feeding means.

29. In a vending machine, a device for pulling tickets from a web of tickets, oscillatory means for imparting the ticket pulling movement, means for returning said movement-imparting means to initial position, means for feeding a ticket web to said ticket pulling device, and means for connecting said oscillatory means to said web-feeding means, only during the return movement of said movement-imparting means.

30. In a vending machine, a device for pulling tickets from a web of tickets, oscillatory means for imparting the ticket pulling movement, means for returning said movement-imparting means to initial position, means for feeding a ticket web to said ticket pulling device, means for connecting said oscillatory means to said web-feeding means, a ratchet geared to said feeding means, an arm connected to said returning means, a pawl mounted on said arm to operate said ratchet, and means adapted to be controlled by said web for moving said pawl into and out of engagement with said ratchet.

31. In a vending machine, web-feeding rollers, a pulling device adapted to detach a ticket from said web, means for operating said pulling device, an oscillatory arm under the control of said operating means, a ratchet geared to said web feeding rollers, a pawl mounted on said arm to engage said ratchet, and means for moving said pawl into and out of engagement with said ratchet.

32. In a vending machine, web feeding means, a pulling device adapted to detach a ticket from said web, means for operating said pulling device, an oscillatory arm under the control of said operating means, a ratchet geared to said web feeding rollers, a pawl mounted on said arm to engage said ratchet, and means for moving said pawl into and out of engagement with said ratchet, during the movement of said oscillatory arm.

33. In a vending machine, web feeding rollers, a pulling device adapted to detach a ticket from said web, means for operating said pulling device, an oscillatory arm under the control of said operating means, a ratchet geared to said web feeding rollers, a pawl mounted on said arm to engage said ratchet, and means for moving said pawl into and out of engagement with said ratchet, said pawl moving means including a cam with portions of its surface at different distances from the periphery of said ratchet.

34. In a vending machine, web feeding rollers, a pulling device adapted to detach a ticket from said web, means for operating said pulling device, an oscillatory arm under the control of said operating means, a ratchet geared to said web feeding rollers, a pawl mounted on said arm to engage said ratchet, and means for moving said pawl into and out of engagement with said ratchet, said pawl-moving means including a cam arm carried by said pawl, and a cam in engagement with said cam arm to move said pawl into and out of engagement with said ratchet.

35. In a vending machine, web feeding means, a pulling device adapted to detach a ticket from said web, means for operating said pulling device, an oscillatory arm under the control of said operating means, a ratchet geared to said web-feeding means, a pawl mounted on said arm to engage said ratchet, and means for moving said pawl into and out of engagement with said ratchet, said pawl moving means including a cam arm carried by said pawl, a cam in engagement with said cam arm to move said pawl into and out of engagement with said ratchet, and means for adjusting the position of said cam.

36. In a vending machine, web feeding rollers, a pulling device adapted to detach a ticket from said web, means for operating said pulling device, an oscillatory arm under the control of said operating means, a ratchet geared to said web-feeding rollers, a pawl mounted on said arm to engage said ratchet, and means for moving said pawl into and out of engagement with said ratchet, said pawl moving means including a cam arm carried by said pawl, a cam in engagement with said cam arm to move said pawl into and out of engagement with said ratchet, and means for adjusting the position of said cam, said cam-adjusting means including a system of levers subject to the position assumed by the end of said ticket web.

37. In a vending machine, web-feeding means, a shaft geared to said web feeding means, means for varying the amount of feeding movement to said shaft, and means for controlling the action of said movement varying means.

38. In a vending machine, web-feeding means, a shaft geared to said web-feeding means, means for transmitting more or less movement to said shaft, and means for controlling the action of said movement transmitting means, including a gage finger movable along said web, and a system of levers normally held by the engagement of said finger with said web and adapted to move when said finger drops over the edge of said web.

39. In a vending machine, web-feeding means, a shaft geared to said web-feeding means, means for transmitting more or less movement to said shaft, and means for controlling the action of said movement transmitting means, said controlling means including an oscillatory shaft, means for periodically oscillating said shaft, a lever arm keyed to said oscillatory shaft, a gage finger pivoted to said lever arm and adapted by the movement of said lever arm to travel over the web, and a system of levers normally retained in one position by said finger when in engagement with said web and adapted to move when said finger drops over the edge of said web.

40. In a vending machine, web-feeding rollers, a pulling device adapted to detach a ticket from said web, means for operating said pulling device, an oscillatory arm under the control of said operating means, a ratchet geared to said web-feeding rollers, a pawl mounted on said arm to engage said ratchet, and means for moving said pawl into and out of engagement with said ratchet, said pawl-moving means including a cam arm carried by said pawl, a cam in engagement with said cam arm to move said pawl into and out of engagement with said ratchet, and means for adjusting the position of said cam, said cam adjusting means including yieldable means for moving said cam away from said ratchet when the pawl cam arm is not in engagement therewith, a lever normally tending to project in the path of said web and adapted to be held out of said path by said web, a second lever adapted to be moved into and out of position to block the movement of said cam toward the ratchet, and means for connecting said levers.

41. In a vending machine, web-feeding rollers, a pulling device adapted to detach a ticket from said web, means for operating said pulling device, an oscillatory arm under the control of said operating means, a ratchet geared to said web feeding rollers, a pawl mounted on said arm to engage said ratchet, and means for moving said pawl into and out of engagement with said ratchet, said pawl moving means including a cam arm carried by said pawl, a cam in engagement with said cam arm to move said pawl into and out of engagement with said ratchet, and means for adjusting the position of said cam, said cam adjusting means including yieldable means for moving said cam away from said ratchet when the pawl cam arm is not in engagement therewith, a gage finger normally tending to project in the path of said web and adapted to be held out of said path by said web, a second lever adapted to be moved into and out of position to block the movement of said cam toward the ratchet, means for connecting said levers, an oscillatory shaft provided with an arm or yoke on which said gage finger is pivotally mounted, and means for oscillating said shaft during the feeding movements of said feed rollers to reciprocate said gage finger along said web.

42. In a vending machine, web feeding rollers, a pulling device adapted to detach a ticket from said web, means for operating said pulling device, an oscillatory arm under the control of said operating means, a ratchet geared to said web feeding rollers, a pawl mounted on said arm to engage said ratchet, and means for moving said pawl into and out of engagement with said ratchet, said pawl moving means including a cam arm carried by said pawl, a cam in engagement with said cam arm to move said pawl into and out of engagement with said ratchet, and means for adjusting the position of said cam, said cam adjusting means including yieldable means for moving said cam away from said ratchet when the pawl cam arm is not in engagement therewith, a gage finger normally tending to project in the path of said web and adapted to be held out of said path by said web, a second lever adapted to be moved into and out of position to block the movement of said cam toward the ratchet, means for connecting said levers, an oscillatory shaft provided with an arm or yoke on which said gage finger is pivotally mounted, and means for oscillating said shaft during the feeding movements of said feed rollers to reciprocate said gage finger along said web, said shaft-oscillating means comprising said shaft and an oscillatory arm partaking of the movement of the first mentioned oscillatory arm and provided with an extension suitably mounted to rigidly engage the arm on said oscillatory shaft when moving in one direction and to yield when moving in the opposite direction.

43. In a ticket-vending machine, means for mounting a web, means for detaching tickets from said web, means for feeding said web, and means for regulating the amount of movement of said web feeding means including a finger normally adapted to occupy a position in the path of said web and to be held out of said path by said web, and means for reciprocating said finger along said web during the web-feeding movements.

44. In a vending machine, web-feeding rollers, a ratchet geared to said web-feeding rollers, an oscillatory arm, a pawl mounted on said arm to engage said ratchet, a cam for moving said pawl into and out of engagement with said ratchet, and means for adjusting the position of said cam.

45. In a vending machine, web-feeding rollers, a ratchet geared to said web-feeding rollers, an oscillatory arm, a pawl mounted on said arm to engage said ratchet, a cam for moving said pawl into and out of engagement with said ratchet, and means for adjusting the position of said cam, said cam adjusting means including yieldable means for moving said cam away from said ratchet when the pawl cam arm is not in engagement therewith, a lever normally tending to project in the path of said web and adapted to be held out of said path by said web, a second lever adapted to be moved into and out of position to block the movement of said cam toward the ratchet, and means for connecting said levers.

46. In a ticket-vending machine, means for feeding a web of tickets, means for detaching the tickets from said web, means for operating said detaching means, including a control instrumentality, means for operating said control instrumentality after each ticket pulling operation, and means rendered ineffective by the presence of the ticket web but adapted to become effective when said web is exhausted, means for operating said control instrumentality comprising a lever provided with a finger normally restrained by the presence of the web and adapted to be released when the web is released, and a lever connected thereto and adapted to block the movement of said control instrumentality operating means.

47. In a ticket-vending machine, means for feeding a web of tickets, means for detaching the tickets from said web, means for operating said detaching means, a reciprocable bar, a shiftable bearing therefor for moving it into and out of position to be operated by said detaching means, means under the control of said web for shifting said bearing, a lever provided with a finger normally held inoperative by the ticket web and a lever connected thereto and adapted to engage said web controlled means for locking the same when the web is exhausted.

48. In a vending machine, web-feeding means, a shaft geared to said web-feeding means, means for transmitting more or less movement to said shaft, and means for controlling the action of said movement transmitting means, said controlling means including an oscillatory shaft, means for periodically oscillating said shaft, a lever arm keyed to said oscillatory shaft, a gage finger pivoted to said lever arm and adapted by the movement of said lever arm to travel over the web, and a system of levers normally retained in one position by said finger when in engagement with said web and adapted to move when said finger drops over the edge of said web, said shaft oscillating means being timed relatively to the feeding movements of said rollers.

49. In a vending machine, web-feeding means, a shaft geared to said web-feeding means, means for transmitting more or less movement to said shaft, and means for controlling the action of said movement transmitting means, said controlling means including an oscillatory shaft, means for periodically oscillating said shaft, a lever arm keyed to said oscillatory shaft, a gage finger pivoted to said lever arm and adapted by the movement of said lever arm to travel over the web, and a system of levers normally retained in one position by said finger when in engagement with said web and adapted to move when said finger drops over the edge of said web, said shaft oscillating means including an oscillatory arm keyed to said shaft, an oscillatory power shaft, an arm keyed to said power shaft and provided with an extension connected thereto by an elbow joint, and yieldable means for holding said extension during the movement of said arm in one direction.

50. In a vending machine, web-feeding means, a shaft geared to said web-feeding means, means for transmitting more or less movement to said shaft, and means for controlling the action of said movement transmitting means, said controlling means including an oscillatory shaft, means for periodically oscillating said shaft, a lever arm keyed to said oscillatory shaft, a gage finger pivoted to said lever arm and adapted by the movement of said lever arm to travel over the web, and a system of levers normally retained in one position by said finger when in engagement with said web and adapted to move when said finger drops over the edge of said web, said shaft oscillating means including an oscillatory arm keyed to said shaft, an oscillatory power shaft, an arm keyed to said power shaft and provided with an opening, an extension connected to said arm by an elbow joint, said extension being provided with an arcuate arm concentric with the axis of said elbow joint, and a spring mounted on said arcuate arm to normally retain said elbow joint unflexed.

51. In a vending machine, a pair of feed rollers, locking mechanism therefor, an oscillatory frame, clamping arms pivotally mounted on said frame, fixed tracks for holding said arms in clamping position during their movement away from said rollers, movably mounted plates adapted to engage said clamping arms during their movement in the other direction to draw said arms together, a lever adapted to be moved in one direction by one of said arms and in the opposite direction by the return movement of said frame, and means for connecting said lever to said locking means.

52. In a ticket vending machine, means for holding a web of tickets, means for feeding said web, said web-feeding means being provided with means for locking it against movement during its periods of rest, and means for detaching a ticket from said web, said detaching means being movable away from said feeding means about an axis transverse to the ticket web.

53. In a vending machine, the combination with web-feeding means and a ratchet which partakes of the movement thereof, a dog for locking said ratchet and a web-feeding means, ticket pulling means movable toward and away from said web-feeding means, and means operated by said ticket-pulling means for moving said dog into and out of engagement with said ratchet.

54. In a ticket-vending machine, web-feeding means, means for locking the same against movement, ticket pulling means movable relatively to said web-feeding means, and means adapted to be actuated by said ticket-pulling means for operating said locking means.

55. In a vending machine, web-feeding means, means for detaching portions of said web, means for imparting more or less movement to said web-feeding means, a gage finger adapted to rest against a portion of said web, and means operated by said gage-finger to modify the action of said web-feeding means when said gage finger is not sustained by said web.

LIONEL M. LEVINE.

Witnesses:
ARTHUR L. RICE,
GEORGE W. N. HALLOCK.

Copies of this patent may be obtained for five cents each, by addressing the "Commissioner of Patents, Washington, D. C."